2,998,324
METHOD OF COATING POLYPROPYLENE

Robert P. Hirt, Wilmington, Del., assignor to Hercules Powder Company, Wilmington, Del., a corporation of Delaware
No Drawing. Filed July 22, 1959, Ser. No. 828,723
7 Claims. (Cl. 117—47)

The present invention relates to a method of coating polypropylene. More particularly, it relates to a method for applying a durable and adherent decorative coating to polypropylene.

Polypropylene of predominantly crystalline structure is a relatively new synthetic polymer that is finding wide acceptance in the plastics art. In many of its uses it is desirable to coat the polymer, or articles made therefrom, to modify the surface appearance. However, polypropylene has been found to be unreceptive to the majority of lacquers, enamels and similar coating compositions that are normally used to provide a decorative appearance. The major problem is one of adhesion; the majority of coatings adhere to polypropylene so poorly that they can be removed with very little effort by peeling or scraping.

To solve this problem, attempts were made to modify the surface properties of polypropylene and thus make it receptive to coatings. In particular, it was found that the surface tension of the polymer could be increased by subjecting it to any one of several known treatments that have been shown capable of increasing the surface tension of polyethylene and other synthetic polymers. Such treatments, while they were found effective for increasing the surface tension of polypropylene also, nevertheless did not provide a solution to the problem of obtaining adherent coatings because, quite unlike the results obtained with other polymers, the vast majority of known coatings do not adhere to polypropylene even after its surface tension has been raised considerably.

The present invention is based on the further discovery that decorative coatings that adhere remarkably well can be produced on polypropylene by a multistep procedure involving the selection of certain coating compositions as primer and top coats. The method comprises the steps of (1) treating polypropylene to increase its surface tension to the point that a drop of aqueous alcohol applied to the surface will spread uniformly thereover; (2) applying to the treated surface a wash primer prepared from ingredients including poly(vinyl butyral), phosphoric acid and a chromium compound selected from the group consisting of chromium trioxide and insoluble zinc chromate; and (3) applying to the primed surface as a top coat a lacquer containing as its essential film-forming components nitrocellulose and an alcohol-soluble thermosetting resin resulting from the condensation of reactants including a lower aliphatic aldehyde and an amine of the group consisting of urea and melamine.

A simplified flow diagram of the process is as follows:

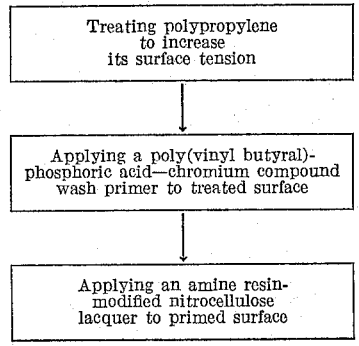

The first step of the process: i.e., treatment of the polymer to increase its surface tension can be accomplished by any of the published methods for treating polyethylene to increase its surface tension. These are numerous and varied; they include, for instance, heat and flame treatment; treatment with ozone, a gaseous halogen and/or ultraviolet light; electronic treatment; and chemical treatment with sulfuric acid and sodium dichromate. All of these methods have the common result of increasing the surface tension of polypropylene. Their effectiveness is demonstrated by a simple test which consists of applying a drop of a test liquid composed of 74% ethanol and 26% water to a horizontally disposed surface of the treated polymer and observing the way in which the test liquid spreads. On a properly treated surface, the test liquid spreads uniformly, similar to the ripple produced by a stone dropped in a pond. By contrast the test liquid spreads unevenly over ineffectively treated polymer and not at all over untreated polymer.

The second step of the process involves the application of a known wash primer which is characterized by preparation from ingredients including poly(vinyl butyral), phosphoric acid, and a chromium compound which may be either chromium trioxide or insoluble zinc chromate.

The third step of the process comprises the application of a known lacquer of the type commonly referred to as an amine resin-modified nitrocellulose lacquer. The essential film-forming components of such a lacquer are nitrocellulose and an alcohol-soluble urea-aldehyde or melamine-aldehyde thermosetting resin which components for application purposes are formulated with a suitable solvent. The lacquer can, and most often does, contain other ingredients such as alkyd resins, plasticizers and pigments but such ingredients are not necessary to obtain the excellent adhesion that characterizes the coatings obtained by the practice of the invention.

The invention is illustrated by the following detailed examples in which parts and percentages are by weight unless otherwise specified.

Example 1

An injection-molded plaque, 5 x 5 x 1/8", of crystalline polypropylene having a melting point of 167° C. was immersed for 5 minutes at room temperature in a liquid composed of 6.5 parts by weight of sodium dichromate ($Na_2Cr_2O_7 \cdot 2H_2O$) and 93.5 parts of 96% sulfuric acid. The plaque was next washed in water until free of acid and then dried at room temperature. After drying, a drop of the aforementioned test liquid was observed to spread uniformly, thus showing that the surface tension of the polypropylene had been raised to the necessary degree.

Thereafter, the plaque was coated with a poly(vinyl butyral) wash primer of the following composition:

| | Lbs./100 gal. |
|---|---|
| Resin component: | |
| Poly(vinyl butyral) (18% vinyl alcohol units) | 56 |
| Zinc chromate (insoluble type) | 54 |
| Magnesium silicate | 8 |
| Lampblack | 0.6 |
| n-Butanol | 125 |
| Ethanol | 380 |
| Acid component: | |
| Phosphoric acid (85%) | 28 |
| Water | 25 |
| Ethanol | 102 | which had been freshly prepared by mixing 4 gallons of the resin component with one gallon of acid component and stirring the mixture until homogeneous. The wash primer was then allowed to dry for one hour at room temperature to provide a prime coat 0.3 mil thick.

Next, there was applied to the primed surface of the plaque a lacquer of the following composition:

Solids: Parts
- "RS Nitrocellulose," ¼ sec _____ 23
- Diisooctyl phthalate _____ 9
- Nonoxidizing alkyd [1] _____ 45
- Melamine-formaldehyde resin [2] _____ 23
- $TiO_2$ (rutile) _____ 32
- Phthalocyanine green _____ 1

Solvent: Percent
- Ethanol _____ 10
- Methyl isobutyl ketone _____ 40
- Toluene _____ 40
- "Cellosolve" acetate _____ 10

[1] Reaction product of pentaerythritol, phthalic anhydride, ethylene glycol, and pelargonic acid in weight ratio of 23:43:10:40.
[2] Reaction product of 1 mole of melamine and 3 moles of formaldehyde etherified with n-butanol (50% solids in 60:40 mixture of butanol and xylol).

This last coating was applied by spraying the lacquer at 30% solids content in an amount to provide a top coat of 2 mils thickness and then drying for 48 hours at room temperature.

The adhesion of the final coating was evaluated by three different tests. In the first test, conventional transparent "Cellophane" tape was applied to the coated surface with uniform finger pressure and then stripped off in a jerky motion. In the second test the coating was scratched as severely as possible with a fingernail and in the third test the coating was first cross-hatched with a razor blade and then subjected to the above-described test with transparent cellophane tape. The following ratings were assigned to indicate the quality of adhesion:

Excellent—No coating stripped in any of the above tests.
Good—A small amount of coating was stripped in one out of the three tests.
Fair—Some coating was stripped from the plastic in at least two out of three tests.
Poor—Some or considerable coating was stripped in all three tests.

The coating prepared as described in the example rated excellent.

For the purpose of showing the effectiveness of the method of the invention, the procedure of the example was modified by the omission of the prime coating. The resultant coating was rated only fair in the property of adhesion. Modification of the example by elimination of the preliminary surface treatment gave much poorer results since adhesion was extremely poor.

*Example 2*

The procedure of Example 1 was repeated with the exception that a different lacquer was employed for the top coat. The lacquer used in this example had the following composition:

Solids: Parts
- "RS Nitrocellulose," ½ sec _____ 25
- Nonoxidizing alkyd [1] _____ 40
- Diisoctylphthalate _____ 5
- Urea-formaldehyde resin [2] _____ 30
- Monobutyl phosphoric acid _____ 3.5
- Carbon black _____ 6.6

Solvent: Percent
- Ethanol _____ 10
- n-Butanol _____ 5
- Toluene _____ 50
- Butyl acetate _____ 25
- "Cellosolve" acetate _____ 10

[1] Same as Example 1.
[2] Reaction product of 1 mole urea and 2 moles formaldehyde etherified with n-butanol (50% solids in 40:60 mixture of toluene and n-butanol).

The adhesion of the coating rated excellent in accordance with the tests previously described. Attempts to omit the preliminary surface treatment and/or the prime coat gave poor results as in Example 1.

*Example 3*

The procedure of Example 1 was repeated with the modification that the plaque of polypropylene, instead of being given a preliminary treatment with sodium dichromate and sulfuric acid, was treated by impinging a flame on its surface until the surface softened. A drop of alcohol and water when applied as before spread evenly over the treated surface showing that the preparation was adequate.

The coating applied to the plaque was rated excellent in the previously described adhesion tests.

*Example 4*

The plaques coated as in Examples 1, 2 and 3 were divided into three equal parts and one part of each plaque was subjected, respectively, to 18-hours' immersion in water, to 10-min. immersion in boiling water, and to 3 weeks' exposure at 100° F. and and 100% relative humidity. After subjection to these conditions none of the coatings showed any evidence of poor adhesion.

*Example 5*

The procedure of Example 1 was repeated with the exception that the primer of that example was replaced with a primer prepared by reacting an alcoholic solution of poly(vinyl butyral) containing 18% vinyl alcohol units with 4.5% of chromium trioxide and 10% of 85% phosphoric acid based on the weight of poly(vinyl butyral) and thereafter dissolving the reaction product in butanol to form a sprayable solution.

The quality of the adhesion of the final coating rated excellent in this example also.

It is one of the anomalies of the invention that the top coat lacquer must be an amine resin-modified nitrocellulose lacquer; numerous attempts to use other types of surface coating compositions have invariably resulted in much poorer adhesion. For instance, a lacquer similar to that of Example 1 but omitting the melamine-formaldehyde resin was an unsuccessful replacement for the amine-modified nitrocellulose lacquer employed in the invention; the final coating in this case rated poor in adhesion when tested as previously described.

Other lacquers also gave poor adhesion including a nitrocellulose metal lacquer, a nitrocellulose furniture lacquer, a chlorinated rubber lacquer, a cellulose acetate lacquer and a commercial acrylic automotive lacquer. In essence, from testing numerous lacquers it has been established that in order to obtain excellent adhesion the lacquer must contain both the amine-aldehyde resin and nitrocellulose.

The polyproylene which is coated according to the process of this invention is predominantly of crystalline, as distinguished from amorphous, structure; any polypropylene whose crystalline content is such that the polymer has a melting point (the temperature at which loss of crystallinity occurs as evidenced by disappearance of birefringence) of at least about 160° C. can be used. Polypropylene of this description can be prepared by any of several methods as, for example, by the processes of Belgian Patents 546,856 and 538,782.

The various methods and means by which the surface tension of polypropylene can be increased in the first step of the present process are well known so that no elaborate description is necessary. Simply by way of amplification it appears that the particular method chosen to accomplish this objective is immaterial for the purposes of the invention and any of the methods already described can be deemed equally satisfactory.

The wash primers that are employed in the second step of the process, also being well known, require little description. Briefly, however, they are of two types.

The first type is one that is commercially sold in the form of two components that are mixed shortly before application. One component contains poly(vinyl butyral) comprising from about 4 to 24% vinyl alcohol units and basic zinc chromate in a suitable solvent while the other component is essentially phosphoric acid. The second type of wash primer, which employs chromium trioxide instead of zinc chromate, is normally supplied as a single package primer. It is prepared by reacting poly(vinyl butyral) containing from 4 to 24% vinyl alcohol units with phosphoric acid and chromium trioxide and dissolving the reaction mixture in a suitable solvent.

The lacquer employed in the third step of the process is also a known material whose essential components are nitrocellulose and an alcohol-soluble thermosetting resin prepared by reaction of ingredients including a lower aliphatic aldehyde and an amine selected from the group consisting of urea and melamine. The nitrocellulose can be any soluble type having a nitrogen content of 10.8 to 12.6% and a viscosity ranging from 18 centipoises to 100 seconds.

The alcohol-soluble thermosetting resin can be prepared by any of several well known methods by which an excess of a lower aliphatic aldehyde, such as formaldehyde, acetaldehyde or butyraldehyde, is condensed with urea or melamine and the product etherified with an alkanol of 3 to 8 carbon atoms, e.g., isopropanol, n-butanol, n-hexanol or n-octanol. The etherification can be effected by carrying out the condensation in the presence of the alkanol or by adding the alkanol after condensation has taken place. Generally, an acid catalyst is used. The resins are available in commerce generally in the form of concentrated syrups or pastes in the etherifying alcohol with or without another solvent such as toluene or xylene. More details can be found in U.S. 2,346,083, U.S. 2,367,423, U.S. 2,218,474 and Encyclopedia of Chemical Technology, 1, 758 (1947).

The lacquer preferably will comprise from about 0.5 to 2.0 parts of nitrocellulose for each part of the alcohol-soluble thermosetting resin, approximately equal amounts of each being the most commonly used proportion. While not essential for good adhesion in the process of the invention, it is desirable that the lacquer also contain one or more plasticizers to improve the flexibility of the final film. Useful plasticizers include materials such as dibutyl phthalate, dioctyl phthalate, tricresyl phosphate, and the like. Another desirable, but optional, ingredient is a nonoxidizing alkyd resin which serves the primary purpose of improving the gloss of the final film. The nonoxidizing alkyd can be any of those commonly employed in nitrocellulose lacquers; the most common type is prepared by reaction of a polyhydric alcohol, a polybasic acid and a nonoxidizing monobasic acid. The lacquer solids also can include a suitable dye or pigment. Any suitable lacquer solvent can be used as the vehicle to achieve the viscosity desired for application by brushing, spraying etc.

What I claim and desire to protect by Letters Patent is:

1. The method of coating a crystalline polymer of propylene comprising the steps of (1) treating the polymer to modify its surface to the point that a drop of a test liquid composed of 74% ethanol and 26% water applied to a horizontal surface of the treated polymer spreads uniformly, (2) applying to the treated surface a wash primer prepared from ingredients including poly(vinyl butyral), phosphoric acid and a chromium compound of the group consisting of chromium trioxide and insoluble zinc chromate; and (3) applying to the primed surface as a top coat a lacquer containing as its essential film-forming components nitrocellulose and an alcohol-soluble thermosetting resin resulting from the condensation of reactants including a lower aliphatic aldehyde and an amine of the group consisting of urea and melamine.

2. The method of coating a crystalline polymer of propylene comprising the steps of (1) treating the polymer by immersing said polymer in a mixture of sodium dichromate and sulfuric acid to modify its surface to the point that a drop of a test liquid composed of 74% ethanol and 26% water applied to a horizontal surface of the treated polymer spreads uniformly, (2) applying to the treated surface a wash primer prepared from ingredients including poly(vinyl butyral), phosphoric acid and a chromium compound of the group consisting of chromium trioxide and insoluble zinc chromate, and (3) applying to the primed surface as a top coat a lacquer containing as its essential film-forming components nitrocellulose and an alcohol-soluble thermosetting resin resulting from the condensation of reactants including a lower aliphatic aldehyde and an amine of the group consisting of urea and melamine.

3. The process of claim 1 in which the chromium compound is insoluble zinc chromate.

4. The process of claim 1 in which the chromium compound is chromium trioxide.

5. The process of claim 1 in which the thermosetting resin is a urea-formaldehyde condensate.

6. The process of claim 1 in which the thermosetting resin is a melamine-formaldehyde condensate.

7. Polypropylene coated by the process of claim 1.

References Cited in the file of this patent

UNITED STATES PATENTS

| | | |
|---|---|---|
| 2,668,134 | Horton | Feb. 2, 1954 |
| 2,801,446 | Wolinski | Aug. 6, 1957 |
| 2,886,471 | Bruce | May 12, 1959 |
| 2,888,367 | Greyson | May 26, 1959 |
| 2,930,106 | Wrotnowski | Mar. 29, 1960 |